(12) United States Patent
Ichiki (10) Patent No.: US 8,391,790 B2
(45) Date of Patent: Mar. 5, 2013

(54) COMMUNICATION DEVICE AND COMMUNICATION METHOD

(75) Inventor: Hiroshi Ichiki, Kanagawa (JP)

(73) Assignee: Sony Corporation, Tokyo (JP)

( * ) Notice: Subject to any disclaimer, the term of this patent is extended or adjusted under 35 U.S.C. 154(b) by 303 days.

(21) Appl. No.: 12/845,147

(22) Filed: Jul. 28, 2010

(65) Prior Publication Data

US 2011/0028092 A1 Feb. 3, 2011

(30) Foreign Application Priority Data

Aug. 3, 2009 (JP) .................. P2009-180902

(51) Int. Cl.
*H04B 5/00* (2006.01)
*H04B 7/00* (2006.01)

(52) U.S. Cl. .............. 455/41.2; 455/41.1; 235/492

(58) Field of Classification Search ............. 455/41.1, 455/41.2; 235/492
See application file for complete search history.

(56) References Cited

U.S. PATENT DOCUMENTS

| | | | | |
|---|---|---|---|---|
| 5,206,495 A | * | 4/1993 | Kreft | 235/492 |
| 6,003,777 A | * | 12/1999 | Kowalski | 235/492 |
| 6,045,043 A | * | 4/2000 | Bashan et al. | 235/441 |
| 6,105,874 A | * | 8/2000 | Berger et al. | 235/492 |
| 6,138,918 A | * | 10/2000 | Tarbouriech | 235/492 |
| 6,145,749 A | * | 11/2000 | Thuringer et al. | 235/492 |
| 6,161,762 A | * | 12/2000 | Bashan et al. | 235/492 |
| 6,168,083 B1 | * | 1/2001 | Berger et al. | 235/492 |
| 6,202,927 B1 | * | 3/2001 | Bashan et al. | 235/451 |
| 6,375,082 B1 | * | 4/2002 | Kobayashi et al. | 235/492 |
| 6,565,007 B1 | * | 5/2003 | Kreft | 235/492 |
| 6,636,146 B1 | * | 10/2003 | Wehoski | 340/10.4 |
| 7,246,750 B2 | * | 7/2007 | Cho | 235/492 |
| 7,472,834 B2 | * | 1/2009 | Conraux et al. | 235/492 |
| 2002/0003168 A1 | * | 1/2002 | Takabayashi | 235/492 |
| 2008/0248769 A1 | * | 10/2008 | Kondo et al. | 455/161.2 |
| 2010/0090805 A1 | * | 4/2010 | Libotte | 340/10.2 |

FOREIGN PATENT DOCUMENTS

| | | |
|---|---|---|
| JP | 2005 115511 | 4/2005 |
| JP | 2007 149475 | 6/2007 |

* cited by examiner

*Primary Examiner* — Temesgh Ghebretinsae
*Assistant Examiner* — Gennadiy Tsvey
(74) *Attorney, Agent, or Firm* — Frommer Lawrence & Haug LLP; William S. Frommer (57) ABSTRACT

A communication device includes a proximity wireless communication antenna for contactless proximity wireless communication with a counterpart instrument antenna in proximity, a first wireless communication processing unit to conduct contactless proximity wireless communication using the proximity wireless communication antenna, a second wireless communication processing unit to conduct wireless communication in a wireless communication format different from that of the first processing unit, a ground potential to be disposed in a surrounding area of the proximity wireless communication antenna and to be connected to a counterpart instrument ground potential when the instrument is in proximity, a detection unit to detect that the counterpart instrument is connected while allowing contactless proximity wireless communication, and a control unit to restrict wireless communication with the second processing unit when the detection unit detects connection and to remove the restriction after connected to the counterpart instrument ground potential with the ground potential during the restriction.

5 Claims, 9 Drawing Sheets

COMMUNICATION DEVICE AND COMMUNICATION METHOD

BACKGROUND OF THE INVENTION

1. Field of the Invention

The present invention relates to a communication device carrying out contactless wireless communication in proximity to an antenna of a counterpart device and a communication method that communicates with the communication device.

2. Description of the Related Art

In recent years, a variety of devices carrying out contactless wireless communication, by moving a fixed device and a portable device in proximity, between both devices has been put into practical use. For example, such devices are widespread that wirelessly communicates by preparing an instrument, such as a contactless IC card or a wireless tag, as a portable device in proximity to a reader, which is a fixed device.

In a case of applications for contactless IC cards, wireless tags, and the like, a reader antenna is configured relatively largely and a card or a tag is moved in proximity to a range in which wireless communication with the reader antenna is allowed, thereby enabling wireless communication. Such a range allowing wireless communication may be considered to be within several centimeters from the reader antenna, for example. The configuration of carrying out contactless wireless communication enables to eliminate a restriction of plug and unplug frequencies in such a case of mounting a portable device, such as an IC card having a terminal in the past, to the fixed device via a connector and to improve usability of the portable device.

Meanwhile, in a case of considering such contactless wireless communication efficiently at high speed of, for example, several or more Gbps, it is considered that a plurality of antennas is respectively disposed in each device and contactless wireless communication is carried out between respective antennas separately to communicate in parallel between the plurality of wireless communication systems. Such high speed contactless proximity wireless communication is applied to data transmission between a variety of information processing devices and peripheral devices thereof, thereby enabling system construction that is free from a restriction of plug and unplug frequencies, such as in a case of connecting peripheral devices with a connector or the like, and allows frequent attachment and removal.

In addition, such devices are put into practical use that can communicate wirelessly even in a situation distant to some extent or can transmit data with another instrument by building a wireless communication unit, such as a wireless LAN, in respective devices separate from the process of contactless wireless communication by moving two devices in proximity. Normally, in a case of loading a plurality of wireless communication functions in one instrument, respective wireless communication functions are activated independently and there is no relationship with conditions of activating other wireless communication functions.

Japanese Unexamined Patent Application Publication No. 2005-115511 discloses an example of carrying out contactless wireless communication between instruments in proximity. Japanese Unexamined Patent Application Publication No. 2007-149475 discloses a technique for hot plugging in a case of high speed transmission on a wired transmission channel between a plurality of instruments.

SUMMARY OF THE INVENTION

However, when a plurality of wireless communication functions is loaded in one instrument, a wireless communication behavior in one of them may affect a wireless communication behavior in another. In particular, in a case of a configuration for high speed contactless proximity wireless communication, signals transmitted by the contactless proximity wireless communication turn out to be high frequency signals. Meanwhile, wireless LANs are also prone to have a transmission bandwidth for use of higher in frequency and there is a higher possibility of mutual interference by overlapping the bandwidths to be used for two wireless communication functions. In a case of interference between two wireless communication functions, there has been a problem of a false behavior.

In the past, as described in Japanese Unexamined Patent Application Publication No. 2007-149475, for example, in a case of connecting a plurality of instruments on a wired transmission channel, it is proposed to take measures not to generate a communication error even in a case of so-called hot plugging where an instrument is removed during data transmission. However, interference between contactless proximity wireless communication and other wireless communication has not been considered in the past.

It is desirable not to interfere with other wireless communication in a case of carrying out high speed contactless proximity wireless communication.

An embodiment of the present invention is applied to a device that carries out: a first wireless communication process to carry out contactless proximity wireless communication with a counterpart instrument in proximity using an antenna for proximity wireless communication disposed in a predetermined position; and a second wireless communication process to carry out wireless communication in a wireless communication format different from that of the first wireless communication process.

Then, the second wireless communication process is restricted in a case that the counterpart instrument with which the antenna for proximity wireless communication wirelessly communicates is connected in a condition of allowing contactless proximity wireless communication is detected. Further, the restriction is removed after a ground potential disposed in a surrounding area of the antenna for proximity wireless communication is connected to a ground potential of the counterpart instrument during the restriction.

In a case of connected to the counterpart instrument, when the connecting condition is complete, the ground potential in a surrounding area of the antenna for proximity wireless communication is connected to the ground potential of the counterpart instrument and the surrounding area of the antenna for proximity wireless communication becomes shielded, and thus contactless proximity wireless communication can be carried out stably. In contrast, until the connecting condition is stabilized, there is a possibility that the second wireless communication process interferes with the first wireless communication process, which is contactless proximity wireless communication. Therefore, until the connecting condition is stabilized, the second wireless communication process is temporarily restricted and the restriction is removed after connecting the ground potential in the surrounding area of the antenna for proximity wireless communication to the ground potential of the counterpart instrument, thereby not interfering with the first wireless communication process.

According to an embodiment of the present invention, in a case of carrying out the first wireless communication process as a contactless proximity wireless communication function and the second wireless communication process, which is different from the first process, the second wireless communication process is temporarily restricted when the counterpart instrument is in proximity for contactless proximity wireless communication. The restriction is removed after completing the shielding in the surrounding area of the antenna for a contactless proximity wireless communication function, and contactless proximity wireless communication can be securely carried out without interference from other wireless communication.

DESCRIPTION OF THE PREFERRED EMBODIMENTS

A description is given to examples of an embodiment of the present invention in the following order.
1. Configuration of Entire System (FIG. 1)
2. Configuration of Portable Device (FIG. 2)
3. Configuration of Base Device (FIG. 3)
4. Example of Antenna Configuration (FIGS. 4, 5)
5. Communication Control Process Example (FIGS. 6 through 8)
6. Behavioral Examples (FIGS. 9A through 11G)
7. Description of Modifications of the Embodiment
[1. Configuration of Entire System]

Figure 1:
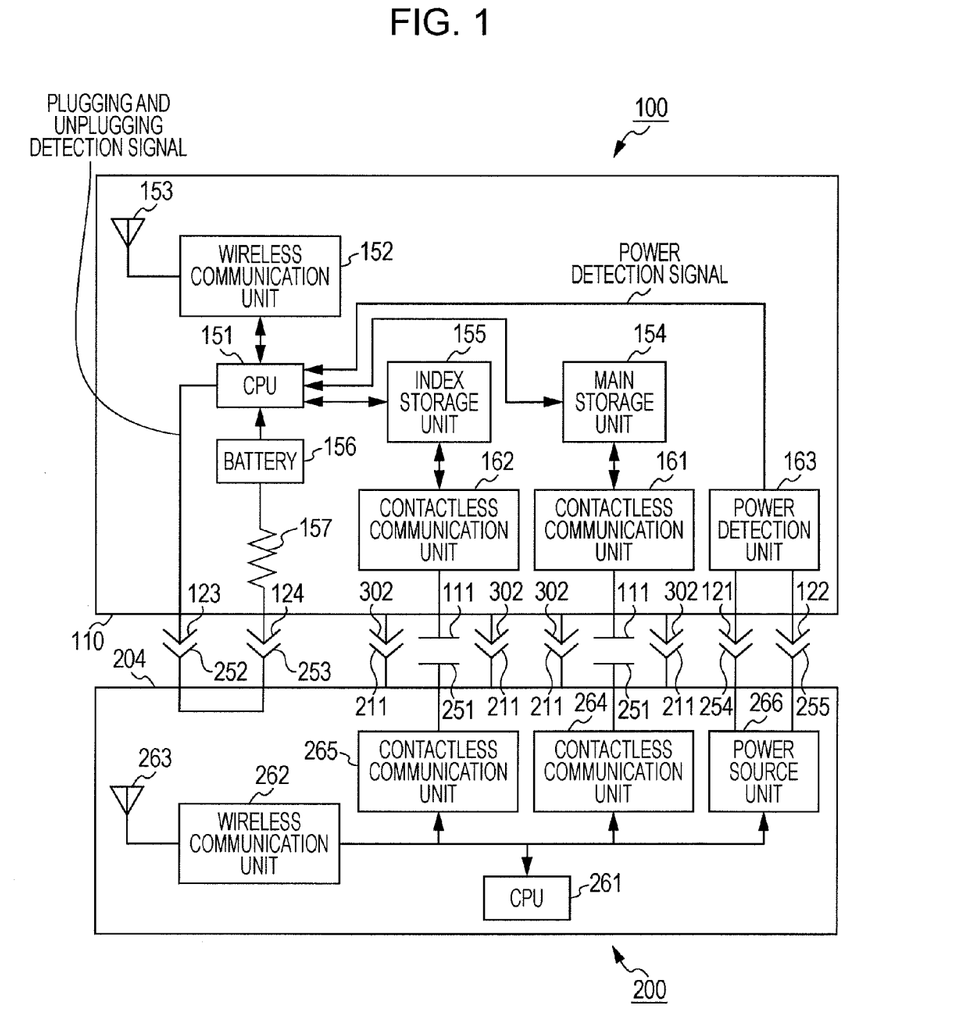
FIG. 1 is a block diagram illustrating a system configuration example according to an embodiment of the present invention.

FIG. 1 illustrates a configuration of the entire communication system. In the present embodiment, this is shown as a system configured with a portable device 100 and a base device 200.

The portable device 100 is provided with a main storage unit 154 configured with a memory mechanism, such as a hard disk drive (HDD). The main storage unit 154 may also be a memory mechanism using a semiconductor memory called as a solid state drive (SSD) alternative to an HDD. In the main storage unit 154, relatively large scale data, such as image data and audio data, is memorized (stored). The portable device 100 is also provided with an index storage unit 155 to memorize index information of the data memorized in the main storage unit 154. The index storage unit 155 is configured with, for example, a nonvolatile memory.

Writing in and reading out of the main storage unit 154 and writing and reading the index information in and out of the index storage unit 155 are executed by control of a central processing unit (CPU) 151. The index information may be memorized directly in the index storage unit 155 when the index information is obtained from outside, while the index information may also be generated by the CPU 151.

The portable device 100 is also provided with a wireless communication unit 152. The wireless communication unit 152 is connected to an antenna 153, and carries out wireless communication for a wireless LAN defined by, for example, IEEE 802.11 standard. The wireless communication unit 152 carries out relatively close distant wireless communication in a distance of from several meters to approximately 100 meters at most with a counterpart instrument. Wireless communication with the wireless communication unit 152 is activated by a power source from a battery 156, which is a secondary cell built in the portable device 100, and the portable device 100 alone (that is, in a condition not to be connected to the base device described later) can wirelessly communicate.

The wireless communication with the wireless communication unit 152 is executed by control of the CPU 151, and the index information memorized in the index storage unit 155, for example, is exchanged with the counterpart instrument. In the present embodiment, there is a case in which wireless communication with the wireless communication unit 152 is temporarily restricted by control of the CPU 151. Details of processes to restrict the wireless communication and processes to remove the restriction of the wireless communication are described later.

The main storage unit 154 is also connected to a contactless communication unit 161 and the index storage unit 155 is also connected to a contactless communication unit 162 to carry out contactless wireless communication, respectively, with a base device in proximity to the extent of almost making contact.

To the respective contactless communication units 161, 162, a plurality of antennas 111 for contactless wireless communication is connected. Although the antennas 111 are connected to the contactless communication unit 161, 162 one by one in FIG. 1, they are configured with a large number of antennas in practice as described later and are configured to wirelessly transmit data by scattering among the plurality of antennas. A specific example of a configuration of the antennas 111 is described later with FIGS. 4 and 5.

The portable device 100 is also provided with a power detection unit 163 to detect a case of obtaining power at a predetermined voltage in power source terminals 121, 122. In a case of detecting power by the power detection unit 163, a power detection signal is provided to the CPU 151. The power detection signal is a signal outputted by detecting that the voltage is stabilized in the power detection unit 163 and the signal is outputted after passing a certain period of time since the power source terminals 121, 122 are connected to the base device.

The portable device 100 is activated by the power obtained by the power source terminals 121, 122 other than some units, such as the wireless communication unit 152 and the CPU 151 driven by the battery 156 described previously. The main storage unit 154 and the contactless communication units 161, 162 at least are activated by the power obtained by the power source terminals 121, 122.

The portable device 100 is also provided with connection detection terminals 123, 124, and is configured to output a power output of the battery 156 from the connection detection terminal 124 via a resistor 157. The connection detection terminal 123 is connected to the CPU 151, and is configured to detect the voltage obtained by the connection detection terminal 123 as a plugging and unplugging detection signal in the CPU 151. As illustrated in FIG. 1, in a condition of connecting the portable device 100 to the base device 200, the connection detection terminals 123, 124 are conducted via connection detection terminals 252, 253 of the base device 200, and thus the CPU 151 detects connection. The plugging and unplugging detection signal thus detected is a signal that is immediately switched when connecting the portable device 100 to connection units 210 through 240 of the base device 200 described later by placing thereon.

Next, a description is given to an internal configuration of the base device 200.

The base device 200 is provided with a wireless communication unit 262. The wireless communication unit 262 is connected to an antenna 263, and is a processing unit carrying out wireless communication in a wireless communication format same as the wireless communication unit 152 of the portable device 100. That is, the communication unit 262 carries out wireless communication for a wireless LAN defined by, for example, IEEE 802.11 standard. Wireless communication with the wireless communication unit 262 is executed by control of a CPU 261, and there is no relationship with contactless proximity wireless communication with contactless communication units 264, 265 described later.

By wirelessly communicating with the wireless communication unit 262, the index information is read out that is memorized in all portable devices 100 existing in the vicinity of the base device 200 to carry out a process of, for example, searching for the portable device 100 in which the desired data is memorized (stored).

The base device 200 is also provided with the contactless communication units 264, 265, and they are connected respectively to a plurality of antennas 251 for contactless wireless communication. The antennas 251 are connected to the contactless communication units 264, 265 one by one in FIG. 1, while they are configured with a large number of antennas in practice similar to the portable device 100 and are configured to wirelessly transmit data by scattering among the plurality of antennas.

The base device 200 is also provided with a power source unit 266 to provide power obtained by converting commercial alternating current power or the like to each unit in the base device 200. The power source unit 266 is also provided with power source terminals 254, 255 and is configured to provide power to the power source terminals 121, 122 of the portable device 100 upon connecting to the portable device 100.

Although a data process configuration of the base device 200 is omitted in FIG. 1, the device can be provided with a variety of processing units, such as a data input unit, a data output unit, an image data processing unit, and a display unit, for example, to be configured to enable data obtained from the portable device 100 to be processed.

[2. Configuration of Portable Device]

Figure 2:
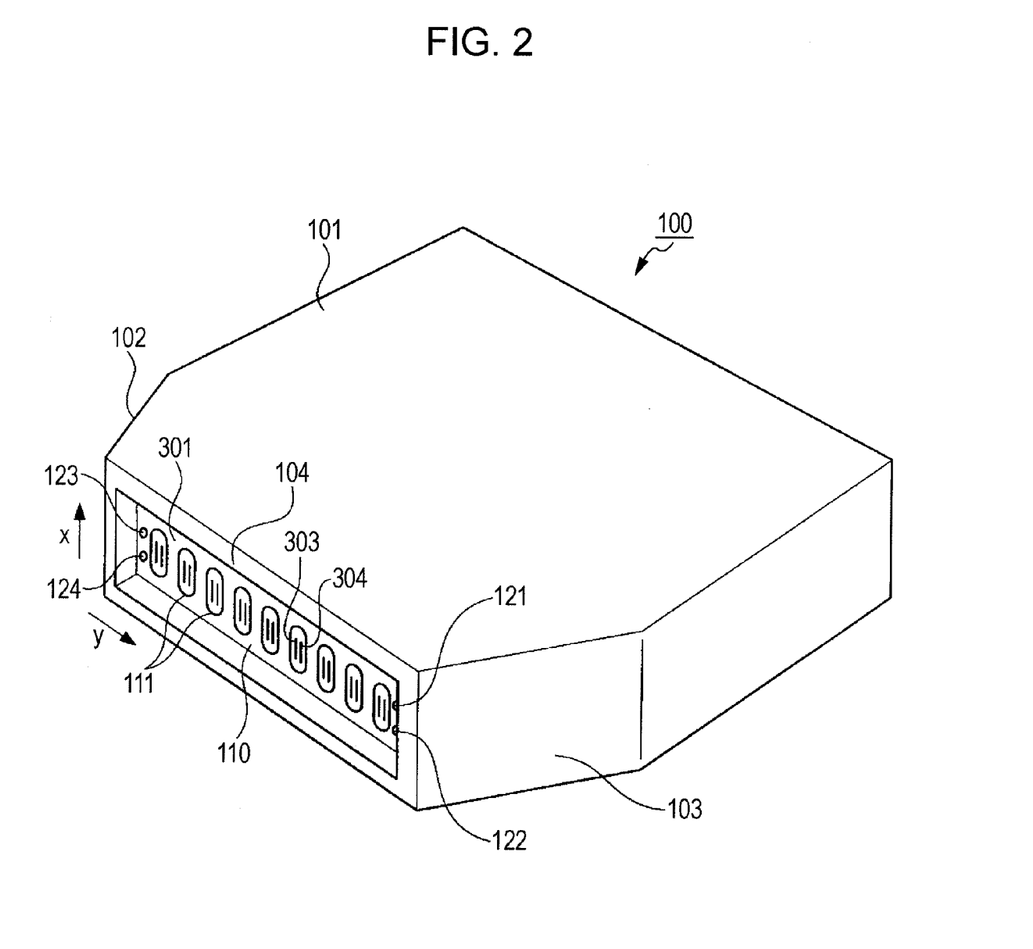
FIG. 2 is a perspective view illustrating a configuration example of a portable device according to the embodiment of the present invention.

FIG. 2 is an example of a shape of the portable device 100.

The portable device 100 is, as illustrated in FIG. 2, configured as a housing 101 of a box shape. The housing 101 is configured with, for example, a synthetic resin.

The housing 101 is made in a thin shape, and has a bottom face 104 with an antenna substrate 110 disposed thereon. The antenna substrate 110 has a surface with a plurality of antennas disposed thereon in parallel. Although details of the configuration and the disposition condition of the antennas are described later, the respective antennas are configured as differential antennas having two straight line conductive areas 303, 304 disposed on each surface.

Figure 4:
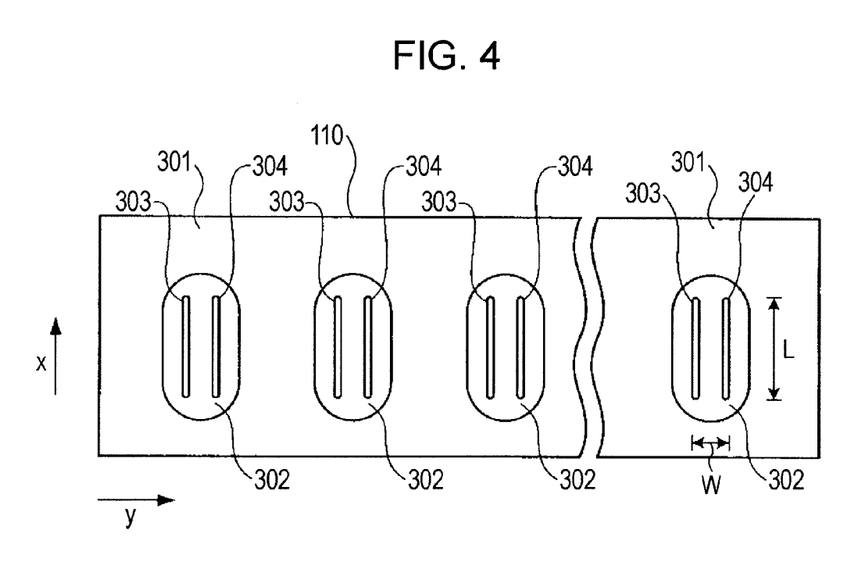
FIG. 4 is a configuration diagram illustrating a pattern example of an antenna disposition area according to the embodiment of the present invention.

As illustrated in FIG. 2, the straight line conductive areas 303, 304 are disposed to extend across the thickness of the housing 101 (in the x direction in FIG. 2). The plurality of antennas are aligned at constant intervals in a direction orthogonal (in the y direction in FIG. 2) to the direction of extending the straight line conductive areas 303, 304 (longitudinal direction). A surrounding area of the straight line conductive areas 303, 304 configuring the antennas is defined as a ground conductive area 301 (FIG. 4).

Further, one and the other ends of the housing 101 in a direction orthogonal to the longitudinal direction of the straight line conductive areas 303, 304 of each antenna (that is, in the y direction) are tapered slope faces 102 and 103. The tapered slope faces 102 and 103 are flat surfaces in this example, and are in a shape of narrowing the bottom face 104, which is a disposition surface of the antenna substrate 110. In addition, inside the tapered slope faces 102 and 103, a plate (shield plate) having a shielding action is disposed.

In a predetermined position of the antenna substrate 110 disposed on the bottom face 104, the power source terminals 121, 122 and the connection detection terminals 123, 124 are disposed. These terminals 121 through 124 are disposed in a condition of not connected to the ground conductive area 301.

[3. Configuration of Base Device]

Figure 3:
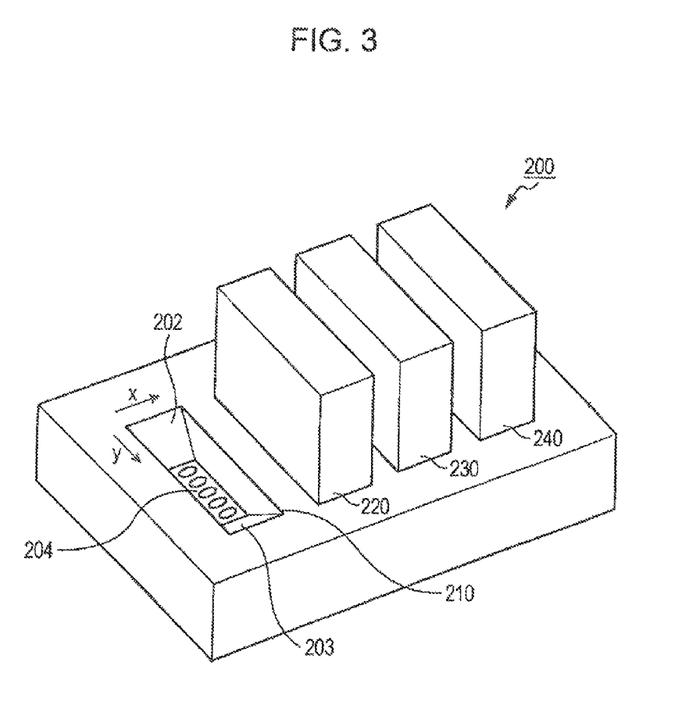
FIG. 3 is a perspective view illustrating a configuration example of a base device according to the embodiment of the present invention.

Then, with reference to FIG. 3, a description is given to a configuration of the base device 200 to which the portable device 100 is connected.

The base device 200 is provided with, as illustrated in FIG. 3, portable device connection units 210, 220, 230, 240, and portable devices 100 can be connected to the respective connection units 210 through 240 one by one. The example of FIG. 3 illustrates a condition in which only the connection unit 210 is not connected to the portable device 100 and a condition in which the portable devices 100 are disposed in the three connection units 220, 230, 240. Each of the connection units 210 through 240 has a same configuration.

As illustrated in FIG. 3, the portable device connection unit 210 is in a shape of a slot having an elongated indentation formed therein and has tapered slope faces 202, 203, and an antenna disposition surface 204 is provided between both tapered slope faces 202, 203. The disposed distance between the tapered slope faces 202, 203 is exactly the same as the disposed distance of the tapered slope faces 102, 103 of the portable device 100, and the slope angle is also the same. Inside the tapered slope faces 202 and 203, a plate (shield plate) having a shielding action is disposed.

The antennas disposed on the antenna disposition surface 204 are also disposed in a condition similar to the antennas disposed on the antenna substrate 110 of the portable device 100. That is, the antenna disposition surface 204 has a plurality of antennas, aligned thereon, respectively having straight line conductive areas 303, 304, and the intervals to align the plurality of antennas and the like are also equal to those of the antenna substrate 110 of the portable device 100.

Although not illustrated in FIG. 3, the antenna disposition surface 204 has power source terminals 254, 255 and connection detection terminals 252, 253 corresponding to the power source terminals 121, 122 and the connection detection terminals 123, 124 of the portable device 100 disposed therein.

Each of the connection units 210 through 240 of the base device 200 thus configured has a configuration of basically completing connection only by placing the portable device 100 thereon.

[4. Example of Antenna Configuration]

Figure 5:
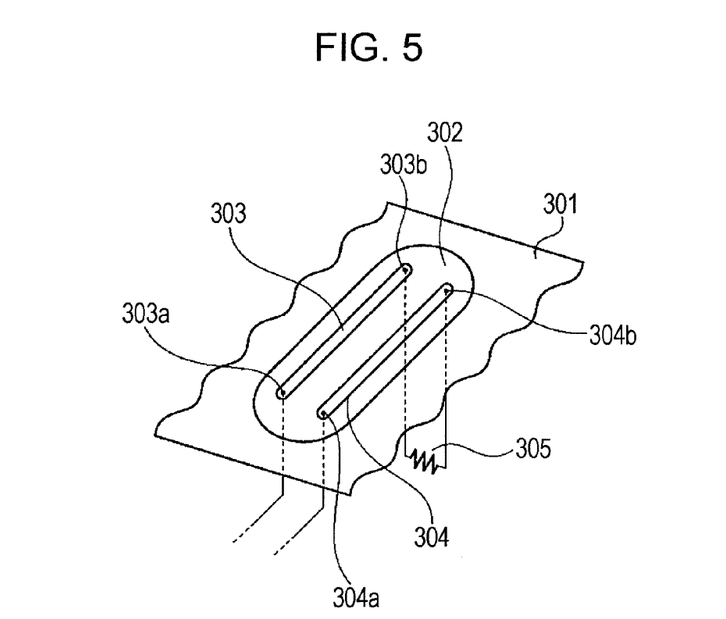
FIG. 5 illustrates an example of an antenna configuration according to the embodiment of the present invention.

Then, a description is given to a configuration of antennas disposed on the antenna substrate 110 of the portable device 100 and a peripheral configuration thereof with reference to FIGS. 4 and 5. The antennas themselves on the antenna substrate also have a configuration identical to the antennas disposed on the antenna disposition surface 204 of the base device 200.

The antenna substrate 110 is configured with a rigid wiring board. The antenna substrate 110 is in an elongated shape so as to enable disposition on the bottom face 104 of the portable device 100 illustrated in FIGS. 1 and 2.

As illustrated in FIG. 4, the surface of the antenna substrate 110 is provided with the ground conductive area 301 across almost the entire surface, and an oval non-conductive area 302 is provided for each antenna disposition area. The non-conductive areas 302 are the portions where no ground conductive area 301 is formed.

In the respective non-conductive areas 302, the two straight line conductive areas 303, 304 are disposed. The two straight line conductive areas 303, 304 are disposed in parallel, where a direction of the thickness (the x direction in FIG. 2) of the portable device 100 is defined as the longitudinal direction. A differential antenna is configured with these two straight line conductive areas 303, 304.

A length L of the straight line conductive areas 303, 304 is, for example, 25 mm and an interval width W between the two straight line conductive areas 303 and 304 is, for example, 6 mm. These values are for one example of a frequency of a signal carrying out wireless communication at a 7.5 GHz band and a transfer rate at 5 Gbps. The numerical values of these dimensions of the antennas of the portable device 100 are equal to these numerical values of the antennas of the base device.

FIG. 5 illustrates details of one antenna.

In the oval non-conductive areas 302 surrounded by the ground conductive area 301, the two straight line conductive areas 303 and 304 having a same thickness are disposed in parallel, and one end of each of the straight line conductive areas 303, 304 is provided with feeding points 303a, 304a. The feeding points 303a, 304a are connected to an antenna connecting conductive area of a communication board via through holes provided in the antenna substrate 110. A differential signal of an opposite phase to each other is provided to one and the other feeding points 303a, 304a of one antenna.

As illustrated in FIG. 5, the other end of each of the straight line conductive areas 303, 304 is provided with resistor connection points 303b, 304b, and a resistor 305 is connected between the resistor connection points 303b and 304b. The resistor 305 is also disposed on the back side of the antenna substrate 110. Although the example in FIG. 5 illustrates an example of connecting with the resistor, they may also be connected with another element.

The antenna illustrated in FIG. 5 is disposed in plural and continuously in parallel as illustrated in FIG. 4.

[5. Communication Control Process Example]

Figure 6:
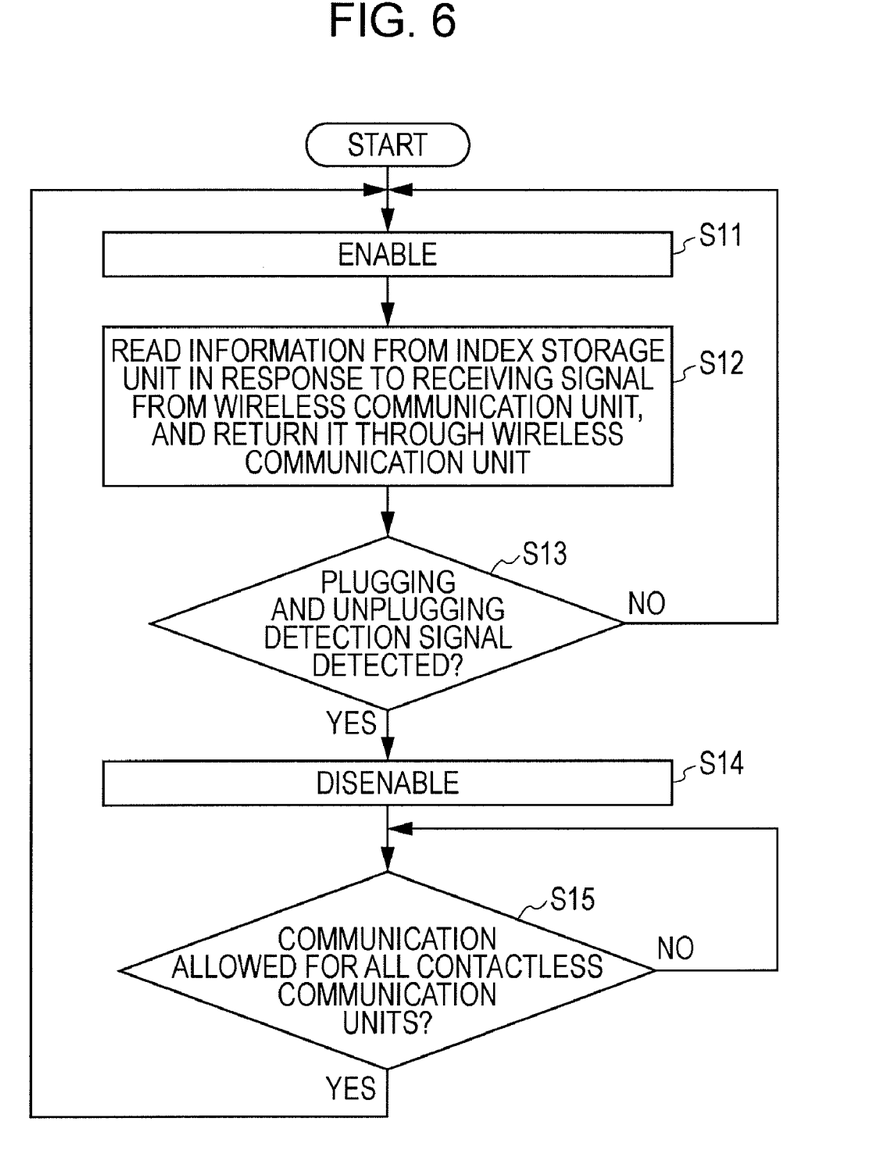
FIG. 6 is a flowchart showing a communication process example (Example 1) according to the embodiment of the present invention.
Figure 7:
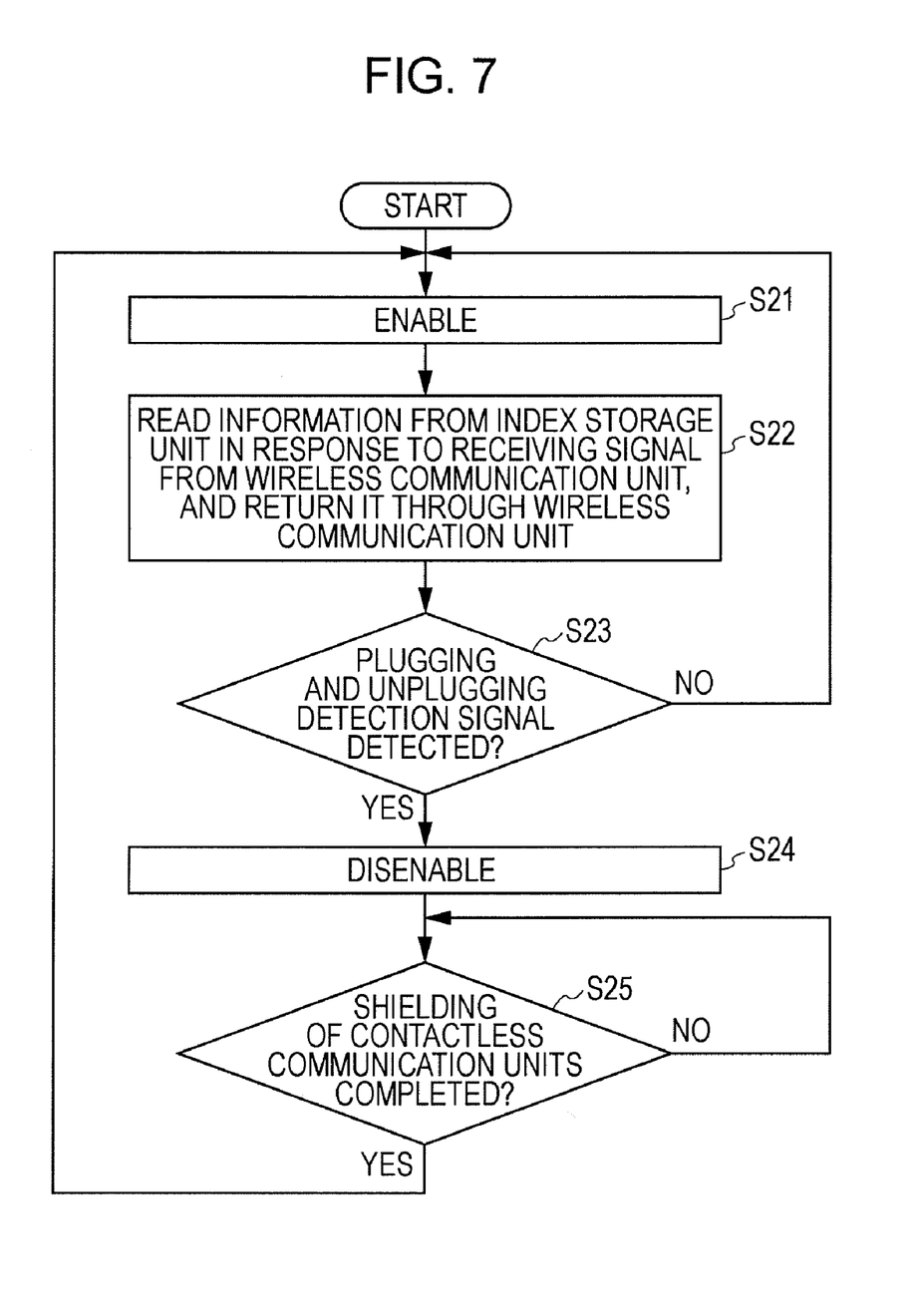
FIG. 7 is a flowchart showing a communication process example (Example 2) according to the embodiment of the present invention.
Figure 8:
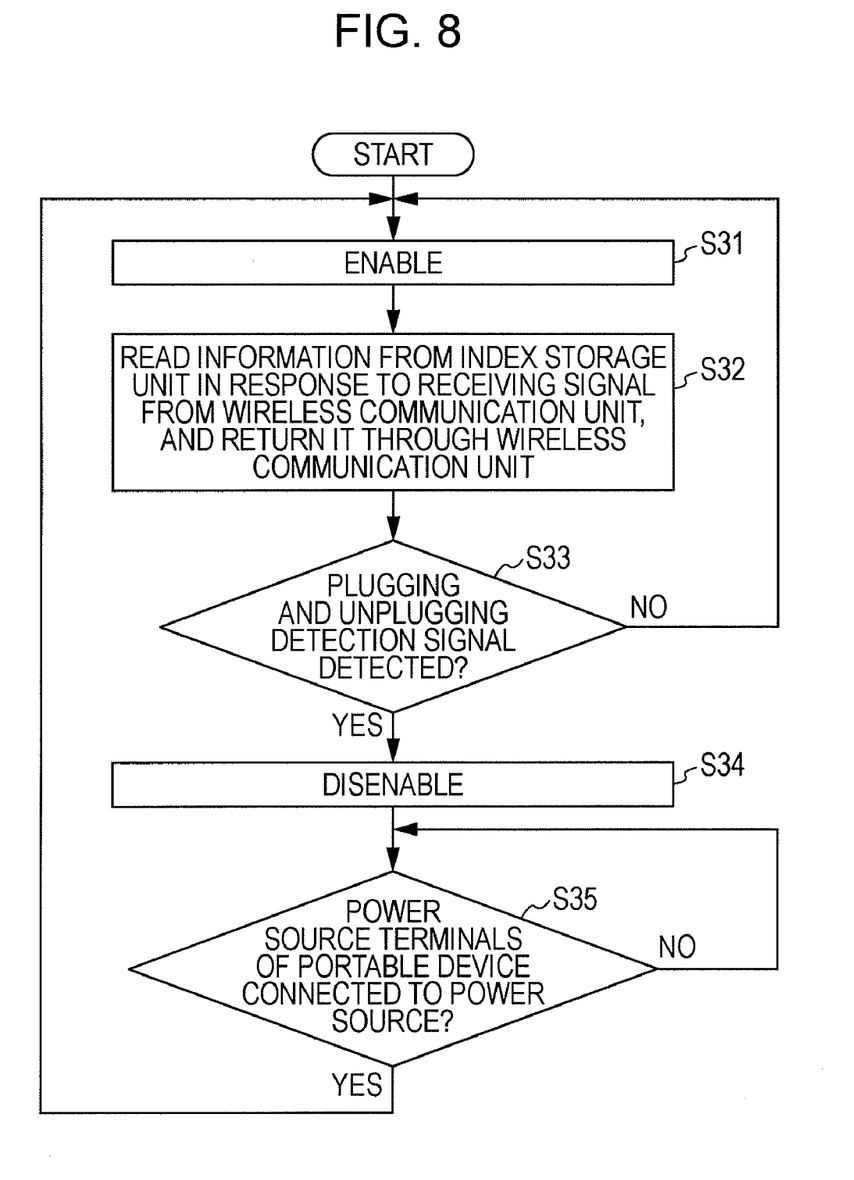
FIG. 8 is a flowchart showing a communication process example (Example 3) according to the embodiment of the present invention.

Then, a description is given to a controlling process of wireless communication with the wireless communication unit 152 of the portable device 100 with reference to the flowcharts in FIGS. 6 through 8. The control of wireless communication with the wireless communication unit 152 is executed by the CPU 151.

FIGS. 6 through 8 show different examples, respectively.

Firstly, the example of FIG. 6 is described. The CPU 151 is normally in an enabling condition in which wireless communication is allowed for the wireless communication unit 152 (step S11). The enabling condition is a condition to allow wireless communication with the wireless communication unit 152 and wireless communication is carried out with another neighboring instrument (such as the base device) as desired (step S12). That is, in response to a receiving signal in the wireless communication unit 152, for example, the information memorized in the index storage unit 155 is read out and returned by wireless transmission from the wireless communication unit 152.

After that, the CPU 151 determines whether or not connection with the base device 200 is detected by the plugging and unplugging detection signal obtained by the terminal 123 (step S13), and in a condition of not detecting the connection, the enabling condition in step S11 is continued.

In contrast, in a case of detecting a change into the connection in step S13, the CPU 151 immediately changes into a disenabling condition (step S14) to restrict wireless communication with the wireless communication unit 152.

In a case of changing into the disenabling condition in step S14, the contactless communication units 161, 162 of the portable device 100 are determined whether or not communication with the base device 200 is allowed (step S15). Here, in a case of determining as communication with the base device 200 is allowed, the procedure goes back to step S11 to change into the enabling condition that allows wireless communication with the wireless communication unit 152 and remove the wireless communication restriction. To allow wireless communication with the contactless communication units 161, 162 of the portable device 100 is to be in a condition of supplying power from the power source unit 266 of the connected base device 200 and activating the contactless communication units 161, 162. In a condition of supplying power to the contactless communication units 161, 162 for activation, the ground potentials 302 of the antenna substrate 110 of the portable device 100 are connected to ground potentials 211 of the base device 200, and the shielding of the surrounding area of the antennas is completed.

Although, in a process example of the flowchart in FIG. 6, wireless communication restriction is removed based on the behavioral condition in the contactless communication units 161, 162, it may also be determined whether or not the shielding is completed directly from the condition of the ground potentials 302 of the antenna substrate 110.

The flowchart in FIG. 7 is a process example in such a case.

To describe the process in FIG. 7, the CPU 151 is normally in an enabling condition in which wireless communication is allowed for the wireless communication unit 152 (step S21). In this enabling condition, the wireless communication unit 152 wirelessly communicates with another neighboring instrument as desired (step S22). That is, in response to a receiving signal in the wireless communication unit 152, for example, the information memorized in the index storage unit 155 is read out and returned by wireless transmission from the wireless communication unit 152.

After that, the CPU 151 determines whether or not connection with the base device 200 is detected by the plugging and unplugging detection signal obtained by the terminal 123 (step S23), and in a condition of not detecting the connection, the enabling condition in step S21 is continued.

In contrast, in a case of detecting a change into the connection in step S23, the CPU 151 immediately changes into a disenabling condition (step S24) to restrict wireless communication with the wireless communication unit 152.

In a case of changing into the disenabling condition in step S24, the CPU 151 determines whether or not the ground potentials 302 of the antenna substrate 110 are connected to the ground potentials 211 of the base device 200 and the shielding is completed (step S25). Here, the procedure stands by in a case of not completing the shielding, and in a case of completing, the procedure goes back to step S21 to change into the enabling condition that allows wireless communication with the wireless communication unit 152 and remove the wireless communication restriction.

The flowchart in FIG. 8 is to determine completion of shielding from detection of power supply.

To describe the process in FIG. 8, the CPU 151 normally in an enabling condition in which wireless communication is allowed for the wireless communication unit 152 (step S31). In this enabling condition, the wireless communication unit 152 wirelessly communicates with another neighboring instrument as desired (step S32). That is, in response to a receiving signal in the wireless communication unit 152, for example, the information memorized in the index storage unit 155 is read out and returned by wireless transmission from the wireless communication unit 152.

After that, the CPU 151 determines whether or not connection with the base device 200 is detected by the plugging and unplugging detection signal obtained by the terminal 123 (step S33), and in a condition of not detecting the connection, the enabling condition in step S31 is continued.

In contrast, in a case of detecting a change into the connection in step S33, the CPU 151 immediately changes into a disenabling condition (step S34) to restrict wireless communication with the wireless communication unit 152.

In a case of changing into the disenabling condition in step S34, the CPU 151 determines whether or not the power supply is started by the power detection signal provided from the power detection unit 163 (step S35). Here, the procedure stands by in a case of not starting power supply, and in a case of starting, the procedure goes back to step S31 to change into the enabling condition that allows wireless communication with the wireless communication unit 152 and remove the wireless communication restriction.

[6. Behavioral Examples]

Then, the timing charts in FIGS. 9A through 11G illustrates a signal condition in reality when control processing according to the flowcharts in FIGS. 6 through 8.

The processes in FIGS. 9A through 11G are almost same from connecting the portable device 100 to the base device 200 until removing the disenabling condition. In FIGS. 9A through 10E, conditions are illustrated in which the enabling condition driving the main storage unit 154 is limited by the disenabling condition, and in FIGS. 11A through 11G, the enabling condition is illustrated in which wireless communication with the wireless communication unit 152 is allowed.

Figure 9A:
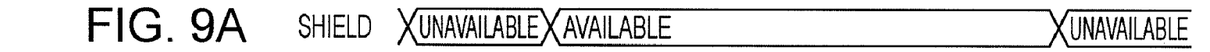
FIGS. 9A through 9D are timing charts illustrating a behavioral example (Example 1) while connecting.
Figure 9B:
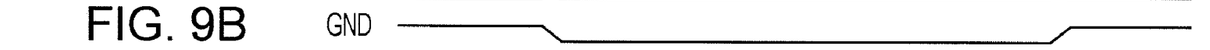

Firstly, to describe the process in FIGS. 9A through 9D, FIG. 9A illustrates a shielding condition and FIG. 9B illustrates a connecting condition of the ground potentials. The condition of FIG. 9B being at a low level shows a condition in which the ground potentials are connected to each other and that being at a high level shows a condition in which they are not connected to the counterpart ground potentials. While the condition of FIG. 9B is at a low level, as illustrated in FIG. 9A, a condition in which the ground potentials are connected to each other makes the shield available and a condition of not connected makes the shield unavailable.

Figure 9C:
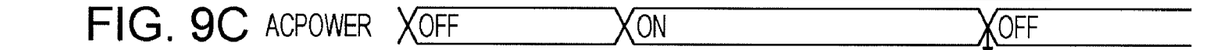

FIG. 9C illustrates a power detection signal detected by the power detection unit 163, in which the signal is turned on showing presence of power supply after passing a certain period of time since the shield becomes available.

Figure 9D:
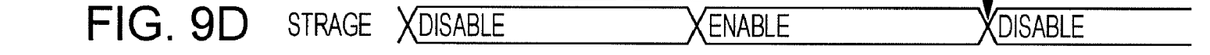

FIG. 9D illustrates whether a driving condition of the main storage unit 154 is enabled or disenabled. In this timing chart of FIG. 9D, the driving condition is disenabled already in the initial condition, and from such a condition, the power detection signal of FIG. 9C is changed from a turned off condition into a turned on condition, thereby becoming into an enabled condition. By becoming into the enabled condition, the main storage unit 154 is started driving to allow the memorized data to be read out and data to be written in. The condition of the main storage unit 154 being driven is also a condition in which contactless proximity wireless communication is carried out with the contactless communication units 161, 162.

In the example of FIGS. 9A through 9D, after that, the portable device 100 is removed from the base device 200, and at the same time of changing the power detection signal of FIG. 9C into the turned off condition, the main storage unit 154 is changed from the enabled condition into the disenabled condition as illustrated in FIG. 9D not to be activated.

In the example of FIGS. 10A through 10E, a removal signal is generated upon removing the portable device 100 is from the base device 200 to change the main storage unit 154 and the contactless communication units 161, 162 into a disenabled condition.

Figure 10A:
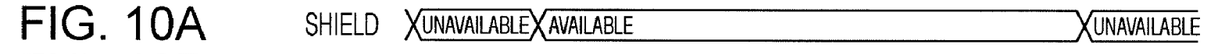
FIGS. 10A through 10E are timing charts illustrating a behavioral example (Example 2) while connecting.
Figure 10B:
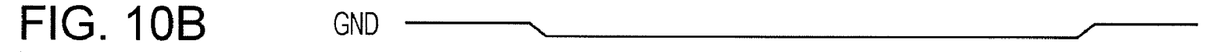
Figure 10C:
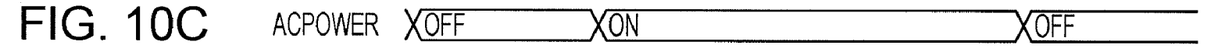

That is, a shielding condition of FIG. 10A, a connecting condition of the ground potentials of FIG. 10B, and a power detection condition of FIG. 10C are same as each condition illustrated in FIGS. 9A through 9C.

Figure 10D:
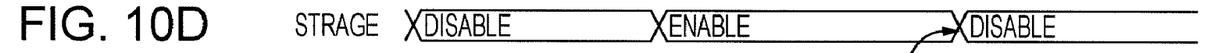
Figure 10E:
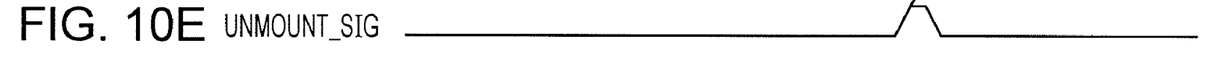

In the example of FIGS. 10A through 10E, upon removing, a removal allowance signal illustrated in FIG. 10E is generated by the base device 200. The removal allowance signal is generated upon, for example, pressing a removal button provided in the base device 200. The removal allowance signal is transmitted via, for example, contactless proximity wireless communication to the portable device 100.

As the removal allowance signal is provided to the CPU 151 of the portable device 100, the CPU 151 is changed into a disenabled condition as illustrated in FIG. 10D to remove the portable device 100 in such a condition. After that, by removing the portable device 100, the power source is turned off and the power detection condition of FIG. 10C becomes turned off and the shielding condition also becomes unavailable.

An example of FIGS. 11A through 11G illustrates, from conditions of the plugging and unplugging signal and the power detection signal, an example of controlling the driving condition of the main storage unit 154 and the contactless communication units 161, 162 and the condition of wireless communication allowance for the wireless communication unit 152. This example of FIGS. 11A through 11G is equivalent to the processes shown in the flowcharts of FIGS. 6 through 8.

Figure 11A:
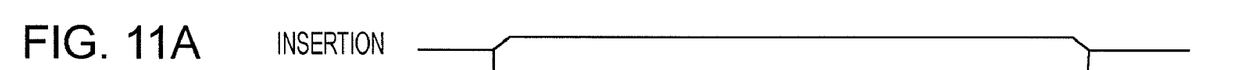
FIGS. 11A through 11G are timing charts illustrating a behavioral example (Example 3) while connecting.

FIG. 11A illustrates a condition of the plugging and unplugging signal obtained by the terminal 123 (FIG. 1), which firstly changes when connecting the portable device 100 to the base device 200.

Figures 11B, 11C, 11D:
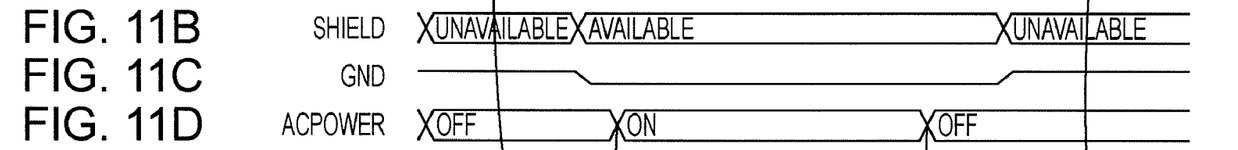
Figures 11E, 11F, 11G:
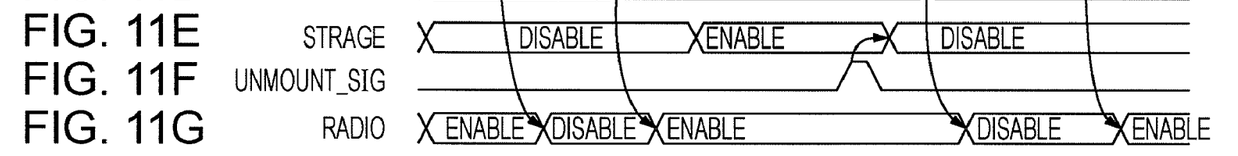

The change of the plugging and unplugging signal changes, as illustrated in FIG. 11G, the condition of the wireless communication unit 152 from the enabled condition into the disenabled condition and temporarily restricts wireless communication. After that, as understood from the shielding condition of FIG. 11B, the connecting condition of the ground potentials of FIG. 11C, and the condition of the power detection signal of FIG. 11D, the shield connection is completed and it becomes in a condition of supplying power to change into the enabled condition as illustrated in FIG. 11G. Due to the change from the disenabled condition into the enabled condition, the restriction of wireless communication with the wireless communication unit 152 is removed.

After the power detection signal is turned on to be stabilized, as illustrated in FIG. 11E, the driving conditions of the main storage unit 154 and the contactless communication units 161, 162 are changed into the enabled condition. The process for connection is up to here.

Then, the process for removal is described.

As illustrated in FIG. 11F, as the removal allowance signal is provided to the CPU 151 of the portable device 100, the CPU 151 changes the driving condition of the main storage unit 154 and the contactless communication units 161, 162 into a disenabled condition as illustrated in FIG. 11D.

Further, by turning off the power detection condition of FIG. 11C, the condition of the wireless communication unit 152 is changed into a disenabled condition as illustrated in FIG. 11G and wireless communication is temporarily restricted. After that, as removal is detected by the plugging and unplugging signal illustrated in FIG. 11A, the condition of the wireless communication unit 152 is changed into an enabled condition as illustrated in FIG. 11G and the restriction of wireless communication is removed.

By changing as illustrated in FIGS. 11A to 11G, wireless communication with the wireless communication unit 152 is temporarily restricted until completing the shielding of the surrounding area of the antennas for contactless proximity communication when connecting and the restriction is removed as the shielding is completed. Accordingly, in a condition of not completing the shielding of the surrounding area of the antennas for contactless proximity communication, wireless communication with the wireless communication unit 152 and contactless proximity communication with the contactless communication units 161, 162 are not carried out at the same time and does not interfere with the contactless communication units 161, 162. Since, in a condition of completing the shielding, the shielding condition suppresses interference from outside, there is no problem to carry out wireless communication with the wireless communication unit 152 and contactless proximity communication with the contactless communication units 161, 162 at the same time.

In addition, wireless communication is also temporarily restricted upon removal, thereby not carrying out wireless communication while the shielding of the surrounding area of the antennas for contactless proximity communication is removed, and thus from this perspective, respective communication is not carried out in a condition of interfering with the units 161, 162.

[7. Description of Modifications of the Embodiment]

While the disposition of the antennas illustrated in each drawing are illustrated relatively largely for the ease of understanding the configuration, a larger number of antennas smaller in size than those in drawings may also be disposed. Although the plurality of antennas is disposed in one array in the examples illustrated in FIG. 4 and the like, the antennas may also be disposed in a plurality of arrays, such as in two or more arrays.

Although the configuration of the antenna elements themselves are described as differential antennas in which two straight line conductive areas are disposed in parallel to provide a differential signal, it may also be antennas configured with one straight line conductor. It should be noted that, by configuring the antennas as the differential antennas illustrated in detail in FIG. 5 for wireless transmission of a differential signal, contactless proximity wireless communication using a high frequency signal can be carried out at high transmission efficiency.

Regarding separate usages of the antennas disposed in plural, although they are described only as simply being used in parallel, the antennas may also be used for more sophisticated separation, such as to be separated into a group of antennas used for transmission and a group of antennas used for reception, for example.

In addition, the configurations of the portable device 100 and the base device 200 illustrated in FIGS. 1 through 3 merely illustrates one preferred example and they may also be in another form. Further, although the portable device 100 illustrated as a configuration example in FIG. 1 is described as a device for memorizing (storing) data, it may also be configured as a device for other process.

In addition, regarding the configuration of antennas illustrated in FIG. 4 and the like, the straight line conductive areas 303, 304 on the antenna substrate configuring the antennas are exposed. In contrast, it may also be in a configuration of not exposing the electrode members by disposing a protective member of some sort on the surface upon disposed in the portable device 100 or the base device 200.

The present application contains subject matter related to that disclosed in Japanese Priority Patent Application JP 2009-180902 filed in the Japan Patent Office on Aug. 3, 2009, the entire content of which is hereby incorporated by reference.

It should be understood by those skilled in the art that various modifications, combinations, sub-combinations and alterations may occur depending on design requirements and other factors insofar as they are within the scope of the appended claims or the equivalents thereof.

What is claimed is:

1. A communication device, comprising:
    an antenna for proximity wireless communication to carry out contactless proximity wireless communication with an antenna of a counterpart instrument in proximity;
    a first wireless communication processing unit to carry out contactless proximity wireless communication using the antenna for proximity wireless communication;
    a second wireless communication processing unit to carry out wireless communication in a wireless communication format different from that of the first wireless communication processing unit;
    a ground potential to be disposed in a surrounding area of the antenna for proximity wireless communication and to be connected, when the counterpart instrument is in proximity, to a ground potential of the instrument;
    a detection unit to detect that the counterpart instrument to wirelessly communicate with the antenna for proximity wireless communication is connected in a condition allowing contactless proximity wireless communication; and
    a control unit to restrict wireless communication with the second wireless communication processing unit in a case that the detection unit detects connection and to remove the restriction after connected to the ground potential of the counterpart instrument with the ground potential during the restriction.

2. The communication device according to claim 1, further comprising a power input terminal to which power is supplied from the counterpart instrument,
    wherein the control unit determines, when detecting a power supply to the power input terminal, as being connected to the ground potential of the counterpart instrument with the ground potential to remove wireless communication restriction in the second wireless communication processing unit.

3. The communication device according to claim 2, wherein the detection unit carries out a detection process using a power source that activates the second wireless communication processing unit.

4. The communication device according to claim 1, further comprising:
- a main memory unit to memorize data; and
- an index memory unit to memorize index information of the data memorized in the main memory unit;
- wherein the first wireless communication processing unit wirelessly communicates the data memorized in the main memory unit, and
- the second wireless communication processing unit wirelessly communicates the index information memorized in the index memory unit.

5. A communication method, comprising the steps of:
- a first wireless communication process to carry out contactless proximity wireless communication with a counterpart instrument in proximity using an antenna for proximity wireless communication disposed in a predetermined position;
- a second wireless communication process to carry out wireless communication in a wireless communication format different from that of the first wireless communication process; and
- restricting the second wireless communication process in a case that the counterpart instrument with which the antenna for proximity wireless communication wirelessly communicates is connected in a condition of allowing contactless proximity wireless communication is detected, and removing the restriction after a ground potential disposed in a surrounding area of the antenna for proximity wireless communication is connected to a ground potential of the counterpart instrument during the restriction.

* * * * *